US009802844B2

(12) United States Patent
Elliott et al.

(10) Patent No.: US 9,802,844 B2
(45) Date of Patent: Oct. 31, 2017

(54) PORTABLE PATHOGEN DEACTIVATION METHOD AND APPARATUS

(71) Applicant: Silver Aqua, Inc., Carlisle, MA (US)

(72) Inventors: David J. Elliott, Carlisle, MA (US); Ronald P. Millman, Jr., Taunton, MA (US); Amber P. Truhanovitch, Webster, MA (US); Tyler H. Albee, Springfield, VT (US); Erin K. Flaherty, Stoughton, MA (US)

(73) Assignee: SILVER AQUA, INC., Carlisle, MA (US)

( * ) Notice: Subject to any disclaimer, the term of this patent is extended or adjusted under 35 U.S.C. 154(b) by 462 days.

(21) Appl. No.: 14/066,070

(22) Filed: Oct. 29, 2013

(65) Prior Publication Data

US 2014/0158640 A1 Jun. 12, 2014

Related U.S. Application Data

(63) Continuation-in-part of application No. 29/436,720, filed on Nov. 8, 2012, now abandoned.

(51) Int. Cl.
*C02F 1/00* (2006.01)
*C02F 1/50* (2006.01)

(52) U.S. Cl.
CPC ............... *C02F 1/50* (2013.01); *C02F 1/505* (2013.01); *C02F 1/002* (2013.01); *C02F 2303/04* (2013.01); *C02F 2307/02* (2013.01)

(58) Field of Classification Search
CPC .. C02F 1/50; C02F 1/505; C02F 1/002; C02F 1/283; C02F 1/685; C02F 1/687; C02F 1/688; C02F 2303/04; C02F 2307/02
See application file for complete search history.

(56) References Cited

U.S. PATENT DOCUMENTS

| 3,563,388 | A | | 2/1971 | Briggs |
| 4,267,455 | A | | 5/1981 | Keller |
| 4,349,512 | A | | 9/1982 | Berger |
| 4,695,379 | A | | 9/1987 | Nohren, Jr. et al. |
| 4,894,154 | A | | 1/1990 | Roz et al. |
| 5,011,602 | A | * | 4/1991 | Totani ............... A01N 25/34 210/242.1 |
| 5,045,195 | A | | 9/1991 | Spangrud et al. |

(Continued)

FOREIGN PATENT DOCUMENTS

EP 0 421 452 B1 6/1996
EP 1 134 012 A1 9/2001

(Continued)

OTHER PUBLICATIONS

International Search Report and Written Opinion, mail date Feb. 6, 2015 for International Application No. PCT/US2014/061991, International Filing Date Oct. 23, 2014 for Silver Aqua, Inc., 13 pages.

(Continued)

*Primary Examiner* — Lucas Stelling
(74) *Attorney, Agent, or Firm* — VLP Law Group LLP

(57) ABSTRACT

A portable, non-filtering, microorganism deactivation device for treating water contaminated with harmful bacteria such as *E. coli* and fecal coliform, includes a housing, said housing containing a high porosity media saturated with an ionically charged material such as colloidal silver.

4 Claims, 19 Drawing Sheets

(56) References Cited

U.S. PATENT DOCUMENTS

| | | | |
|---|---|---|---|
| 5,064,793 A * | 11/1991 | Occelli | B01J 29/87 502/61 |
| H001157 H | 4/1993 | Yanou et al. | |
| 5,496,468 A | 3/1996 | Cormier | |
| 5,681,463 A | 10/1997 | Shimizu et al. | |
| D643,508 S | 8/2001 | Wilkinson et al. | |
| 6,279,751 B1 | 8/2001 | Malkin | |
| D448,448 S | 9/2001 | Hughes et al. | |
| 6,840,386 B2 | 1/2005 | Steger et al. | |
| D506,526 S | 6/2005 | Duncan et al. | |
| D551,318 S | 9/2007 | MacNeil et al. | |
| 7,441,665 B2 | 10/2008 | Bridges et al. | |
| D642,658 S | 8/2011 | Cumberland et al. | |
| D643,090 S | 8/2011 | Cumberland et al. | |
| 8,177,968 B2 | 5/2012 | Wang | |
| 8,394,268 B2 | 3/2013 | O'Brien et al. | |
| 2003/0091767 A1 | 5/2003 | Podhajny | |
| 2005/0106267 A1 | 5/2005 | Frykman et al. | |
| 2005/0242041 A1 | 11/2005 | Cumberland | |
| 2005/0263453 A1 | 12/2005 | Collias et al. | |
| 2006/0180550 A1 | 8/2006 | Moore, III | |
| 2008/0217252 A1 | 9/2008 | Elliott et al. | |
| 2009/0001012 A1 * | 1/2009 | Kepner | A01N 25/34 210/287 |
| 2010/0102002 A1 | 4/2010 | O'Brien et al. | |
| 2010/0206799 A1 * | 8/2010 | Leavitt | C02F 1/002 210/314 |
| 2010/0276347 A1 | 11/2010 | Cui | |
| 2012/0258179 A1 | 10/2012 | Nakamura | |
| 2013/0032542 A1 | 2/2013 | Golan | |
| 2013/0037991 A1 | 2/2013 | Crudden et al. | |
| 2015/0373989 A1 | 12/2015 | Krasnow et al. | |

FOREIGN PATENT DOCUMENTS

| | | |
|---|---|---|
| WO | WO 2008/067816 A2 | 6/2008 |
| WO | WO 2009/058707 A1 | 5/2009 |
| WO | WO 2012/031067 A1 | 3/2012 |
| WO | WO 2013/046213 A2 | 4/2013 |
| WO | WO 2014/153349 A1 | 9/2014 |

OTHER PUBLICATIONS

Botl filter Portable Water Filter System User Guide flyer, www.botfiller.com, 2 pages.

Lantagne, Daniele S., "Investigation of the Potters for Peace Collodial Silver Impregnated Ceramic Filter, Report 1: Intrinsic Effectiveness," Submitted to Jubilee House Community, Dec. 21, 2001, USAID Purchase Order No. 524-0-00-01-00014-5362, 79 pages.

Cloete, Dr., Anton, "All you need to know about Colloidal Silver" Revival Nook Centre of Natural Health, Johannesburg, South Africa, 16 pages.

S. Efrima and B.V. Bronk, "Silver Colloids Impregnating or Coating Bacteria", *J. Phys. Chem. B* Jun. 2, 1998, 102, 5947-5950.

Zeomic Datasheet, "Zeomic for water treatment," Sinanen Zeomic Co., Ltd., retrieved from the Internet <http://www.zeomic.co.jp/en/product/water_treatment_material/index.html>. 3 pages.

Zeomic Datasheet, "Silver-basae inorganic antimicrobial agent 'Zeomic'," Sinanen Zeomic Co., Ltd., retrieved from the Internet <http://www.zeomic.co.jp/en/product/zeomic/index.html>. 5 pages.

Zeomic Datasheet, "Functions of silver-base inorganic antimicrobal agent 'Zeomic'," Sinanen Zeomic Co., Ltd., retrieved from the Internet <http://www.zeomic.co.jp/en/product/zeomic/function/index.html>. 8 pages.

Oyanedel-Craver and Smith, "Sustainable Colloidal-Silver-Impregnated Ceramic Filter for Point-of-Use Water Treatment", Environmental Science & Technology, 2008, 42, 927-933, published on web Dec. 19, 2007.

IZA Structure Commission, Zeolite Structure References, retrieved from the Internet <http://www.iza-structure.org/IZA-SC_main.htm> on Mar. 21, 2016, last updated Jan. 10, 2002, 2 pages.

Roth et al., "A family of zeolites with controlled pore size prepared using a top-down method" Nature Chemistry, vol. 5, Jul. 2013, pp. 628-633, published online Jun. 2, 2013.

* cited by examiner

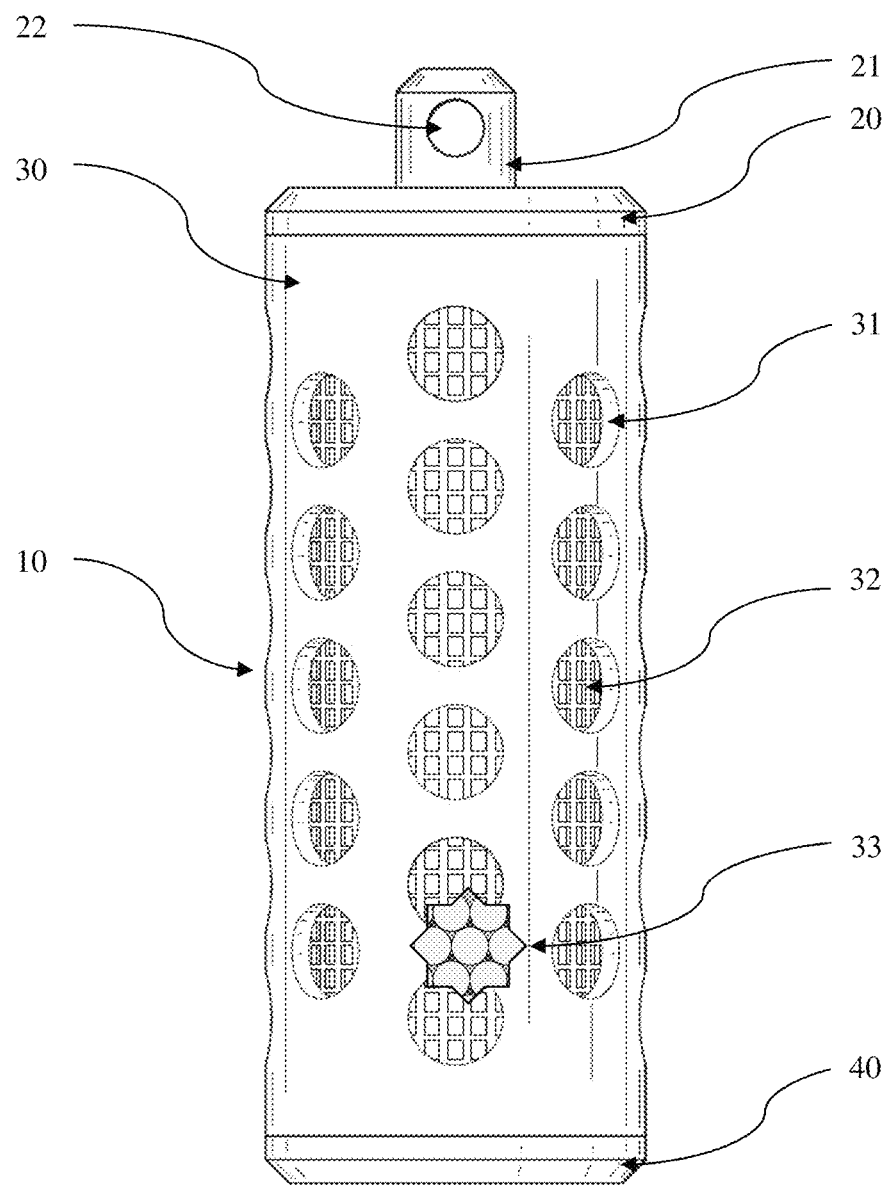

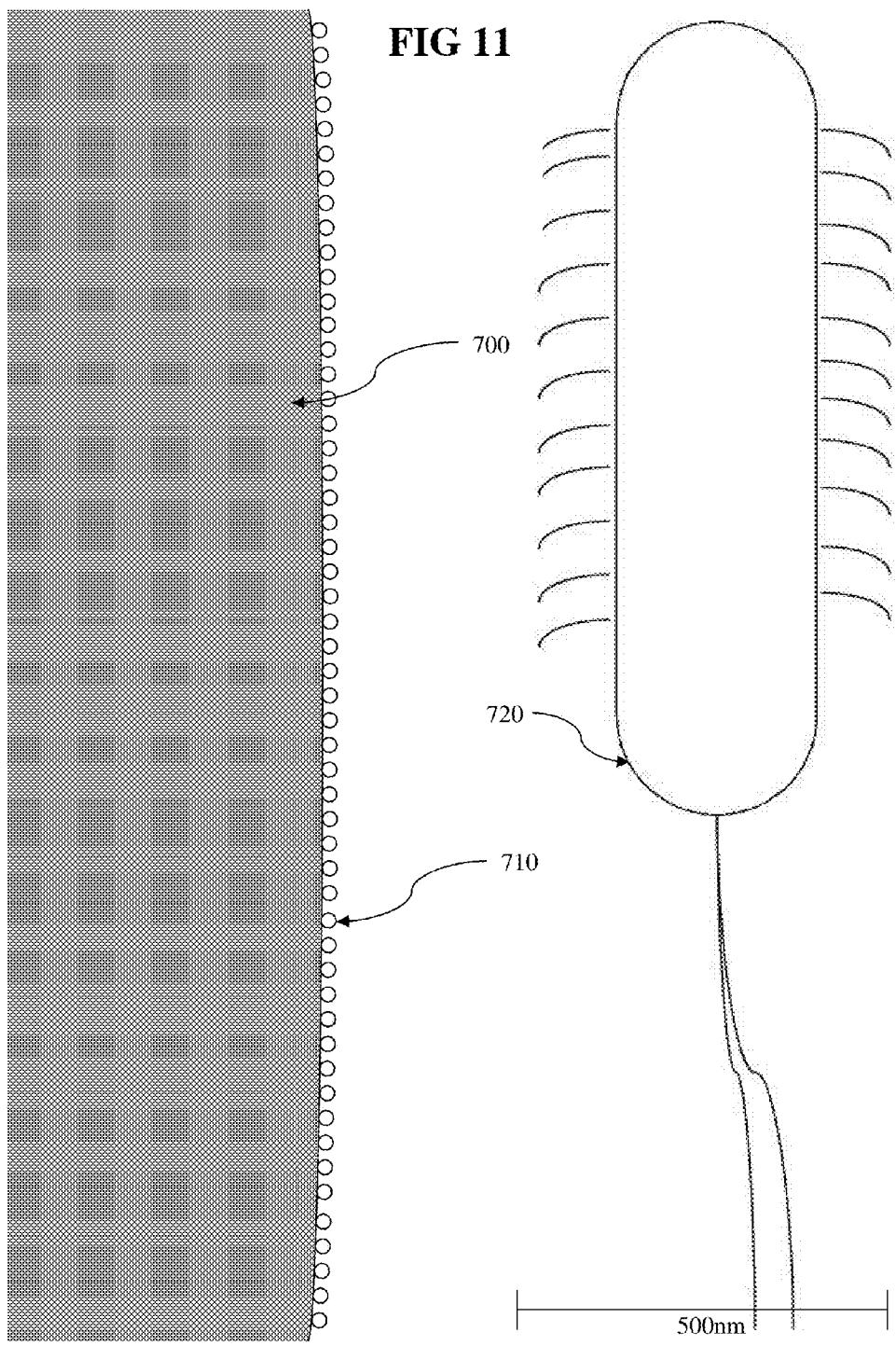

PORTABLE PATHOGEN DEACTIVATION METHOD AND APPARATUS

CROSS-REFERENCE TO RELATED APPLICATIONS

The present application a continuation-in-part of U.S. Design patent application Ser. No. 29/436,720, which was filed on Nov. 8, 2012, by David J. Elliott et al. for a PORTABLE BACTERIA DEACTIVATION DEVICE and is hereby incorporated by reference.

TECHNICAL FIELD

This patent application relates generally to water filtration devices, and more particularly, to a portable water disinfecting device that can neutralize disease causing pathogens in contaminated water, and even more particularly, can deactivate microorganisms quickly by simple immersion in contaminated water. It also relates to the field of water treatment devices and methods that provide safe drinking water by deactivating bacteria, viruses, and other pathogens through the use of a media treated with colloidal silver.

BACKGROUND

Pathogens, particularly bacterial microorganisms, in contaminated water are the leading cause of poor health and disease worldwide. Poor quality drinking water has emerged as a major health concern in all parts of the world, particularly in developing nations. The pathogens or microbial organisms responsible for this problem are generally classified by their sizes. Protozoa are relatively large pathogens, in the range of 1-300 microns, and include cryptosporidia and *giardia*. Bacteria are smaller, typically in the range of 0.1-10 microns, and include *salmonella* and *E. coli*. Viruses are the smallest pathogens, and the most difficult to deactivate, and are typically in the size range of 0.005 to 0.1 microns.

The diseases caused by these microorganisms have symptomatic origins including fevers, diarrhea, and jaundice; while treatable, if left unchecked can develop into serious diseases and possibly death. According to statistics reported by the World Health Organization (www.who.org), water contaminated with harmful bacteria causes the death of about five (5) million humans annually, the majority of whom are children under five years of age.

In developed countries, municipal water systems regularly break down, leaving bacterial contaminants and other pathogens including viruses and parasites in the drinking water. In developing countries, water has become increasingly scarce, and with high density populations, there is often little to no provision for treating water intended for human consumption. It is estimated that over 1.5 billion people lack access to safe drinking water.

RELATED ART

There are many methods and types of portable filters known in the art. For example, known are filters that use pressure from small hand pumps to force water through a filter, or is straw-like filters where people use sucking pressure to draw water through the filter.

Also known in the art are filters that use gravity to get water to flow through a filter element. For example, the head pressure of a volume of water can force the water through the filter. Gravity filters normally take longer to filter water than pressure-based filters and methods.

Also known in the art are several types of filter media to remove pathogens from contaminated water. Ceramic is used for its durability and relatively long life. One example of a ceramic filter is the Penguin 'Special Water Filter Candle', manufactured by Technical Ceramics, Madhyapur, Thimi-10, Bhaktapur, Nepal. These candle filters are typically made of Kaolin white clay and fired at high temperatures. White clay ceramic filters have small pore sizes, typically less than a micron, to trap pathogens, but have the disadvantage of very low flow rates, typically 1 liter per hour or less. In addition, with such small pore size, these types of filters clog easily and need to be replaced frequently. This makes this type of filter costly, and is therefore generally not available to many people who need safe drinking water.

Anti-microbial filters typically have a pore size of less than one micron, which is believed to be an effective size for preventing bacteria, like *E. coli*, and fecal coliform, from passing through a filter element. Because micro-pore and nano-pore filters physically trap bacteria and other solid elements in water, they clog rapidly and have limited effective life times. For example, portable water filters, such as the 1-Pitcher Brita filter, can only be used for a maximum of 40 gallons of water with a lifetime of only 60 days, and then must be replaced. Filters that rely entirely on a physical filtration mechanism will typically not remove all bacteria from contaminated water.

Red clay filters are also known in the art, and generally have larger pore sizes than white clay filters. Red clay filters are typically fired with mixtures of clay and sawdust or rice hulls, and when the sawdust or rice hull combusts in the firing process, the pores that remain make the filter highly porous. Flow rates, however, are still relatively slow with red clay filters, typically in the 3-8 liters per hour range. Another disadvantage of red clay filters is their size and weight, and tendency to crack. They are not practically portable. Their cost is lower, however, than the white clay filters, therefore affordable to people with low incomes. One example of this filter is the Aquasif, a household water treatment system manufactured by Village Forward, a U.S. based non-profit organization with headquarters in Kathmandu, Nepal (www.villageforward.org).

Glass filters are also known in the art. Pleated glass fiber filters have large surface area in order to extend their clog-free lifetime and provide good flow rates. One disadvantage is they cannot be cleaned, and are too large and heavy to be portable for any practical distance.

Also known in the art are silica depth matrix filters which are made of proprietary blends of microscopic fibers and a resin binder. These filters may trap most types of pathogens, but have the disadvantage of clogging easily, and consequently must be replaced frequently.

There are also filters known in the art that use various chemicals with the filter to deactivate pathogens. For example, fluorine, chlorine, activated charcoal, and colloidal silver are used in filters. A red clay filter that uses colloidal silver is provided by Potters for Peace, non-governmental organization (www.potpaz.org). The Potters for Peace filter uses a combination of mechanical separation and the action of colloidal silver to deactivate pathogens. The flow rate of the Potters for Peace filter is between 1 and 2 liters per hour, and is subject to eventual clogging by the build up of contaminants, like bacteria, which may have to be removed by scrubbing the filter surface.

Colloidal silver is a suspension of very fine silver particles in water, and is known for its anti-pathogen properties, especially for deactivation of *E coli* bacteria. There are many publications that explain how silver deactivates pathogens, including "All You Need to Know About Colloidal Silver", Dr. Anon Cloete, Revival Nook Center of Natural Health; "Silver Colloids Impregnating or Coating Bacteria", S. Efrima and B. V. Bronk, J. Phys. Chem. B1998, 102, 5947-5950; "Investigation of the Potters for Peace Colloidal Silver Impregnated Ceramic Filter, Report 1", by Potters for Peace (USAID Purchase Order number 524-0-00-01-0014-5362.

U.S. Pat. No. 5,045,195 shows a personal water filtration and purification device that uses activated charcoal impregnated with silver and layers of a mechanical filter.

U.S. Pat. No. 8,177,968 B2 uses interlocking cups and a pressure to filter water.

U.S. Pat. Appl. No. 2010/012002 A1 shows a portable drinking water purification device using carbon and chlorine and a small pore filter with pressure to filter water.

U.S. Pat. Appl. No. 2013/0032542 A1 shows a personal portable water purification device that uses carbon, pressure, and a micron-sized pore filter to treat water.

U.S. Pat. Appl. No. 2010/0276347 A1 shows a portable water purification device that uses gravity and the pressure of a head of water to treat dirty water.

U.S. Pat. No. 394,268 B2 shows a multiple-chamber water purification device that uses multiple compartments and a micro-filter with a disinfectant agent to treat contaminated water.

U.S. Pat. No. 4,894,154 shows an individual portable water treatment device that incorporates a membrane-type filter with pleats.

U.S. Pat. Appl. No. U.S. 2005/0263453 A1 shows water treatment device containing a mixture of micro-porous and meso-porous carbon particles.

U.S. Pat. No. 4,695,379 shows a water treatment bottle with a tube containing water treatment materials such as carbon, silver impregnated coral sand, and ion exchange resins to remove water-borne contaminants.

U.S. Pat. No. 7,441,665 shows a water purification cartridge for use in gravity feed filtration that may include a halogenated polystyrene hydantoin, a halogenated polylmeric sulfonamide resin, a halogenated hydantoin siloxane and a halogenated polystyrene traiznedione.

U.S. Pat. No. 4,267,455 shows a water purification device that uses ultraviolet tubes in a vessel.

U.S. Pat. No. 4,349,512 shows a bacteriostatic household filter using a media consisting of powdered carbon and silver treated cellulose.

Prior art water treatment devices for water purification also have a relatively high cost of manufacturing and high selling price, preventing their use by over half of the world's population, of which over 1.5 billion do not have access to safe drinking water. According to the World Health Organization (www.who.org), this results in over 4.5 million deaths annually, mainly in children.

Most prior art water treatment devices rely on some form of physical filtration to extract pathogens from contaminated water, a factor that greatly restricts their flow rate and limits useful lifetime of the filter.

There is a need for a water treatment device and method that does not have the aforementioned disadvantages of conventional filtration systems, that can treat contaminated water faster, and at a low cost making it available to the people who need it most.

Finally, there is a need for a water treatment device that is highly portable and easy to use in emergency situations, has low cost, and can quickly and effectively render waterborne pathogens harmless, thereby providing safe, drinkable water.

OBJECTS

It is therefore an object to provide a portable water treatment device that will enable safe, potable drinking water to be obtained from a supply of contaminated water.

It is a further object to provide a portable water treatment device that does not rely on is filtering mechanisms or physical removal of pathogens by the filter to provide safe drinking water.

It is a further object to provide a portable water treatment device that does not rely on halogens such as chlorine, fluorine, or iodine or other harmful chemical agents to deactivate microorganisms.

It is still a further object to provide a portable water treatment device that is small enough to be carried in the palm of a child's hand, or around the neck of a person on a lanyard, or in a small pocket.

It is a still further object to provide a portable water treatment device that can be used by children, elderly people, and sick people in stressed or emergency situations, all without the need for supervision or training.

It is a still further object to provide a portable water treatment device that can be used repeatedly for many months without any change in performance, or without the need to change, replace, clean or re-charge any parts of the filter.

It is a still further object to provide a portable water treatment device that can be made available at low cost so it will be available to people living at or below the poverty line. Over 1.5 billion people worldwide are in this category. Catastrophic disasters around the world add to this number.

It is a still further object to provide a portable water treatment device that effectively deactivates pathogens in contaminated water, such as *E. coli*, rendering the water drinkable and meeting World Health Organization standards for safe drinking water.

It is a still further object to provide a portable water treatment device that can deactivate is water borne microorganisms in less than 2 minutes.

Still other objects and useful applications will become apparent following a review of the detailed description of the preferred embodiments, in conjunction with the drawings, which follow.

SUMMARY

This invention, as precisely defined by the claims that follow, relates generally to a portable water treatment device that contains a highly absorbing media containing a pathogen deactivating agent. Accordingly, a need exists for a portable water treatment device that does not become clogged with repeated use. A need also exists for a portable water treatment device that is small and simple enough to use so that a child, sick person, or elderly person can use it in emergency situations effectively without supervision or training. A need also exists for a low cost water treatment device and method.

A need also exists for a portable water treatment device that can be easily distributed into disaster areas where the available water source has become compromised.

Additionally, a need exists for a portable water treatment device that deactivates water borne pathogens quickly and repeatedly over several months without replacing or recharging any portions of the device. Embodiments provide novel solutions to these needs as described below.

A portable water treatment device to render bacteria contaminated water drinkable and safe for human consumption is disclosed. More specifically, a portable water treatment device comprising a perforated housing containing an absorbing medium containing an anti-microbial agent. In one embodiment, the portable water treatment device does not act as a filter, i.e., does not substantially remove pathogens physically and retain them in the device. Contaminated water may pass through the openings in the housing, and while flowing around the contained media, the action of the anti-microbial agent may render the microorganisms harmless by deactivating is them as the water passes through the device.

Additionally, since the device may have openings in its top and bottom ends as well as along the length of the housing, a maximum amount of contaminated water is treated in a minimum amount of time.

In one embodiment, the housing is a cylinder containing a top end and a bottom end, the top end providing a fitting with a hole in it through which a lanyard may be provided, enabling a person to carry the device around their neck.

In another embodiment, the water treatment device includes a nylon mesh liner covering the inside surfaces of the housing as a means to keep the silver-containing media from falling out of the housing. Once the housing is lined with the mesh and filled with the media containing the anti-bacterial agent, the bottom is sealed and the device is ready to use.

In yet another embodiment, the portable water treatment device is a disposable sealed unit with no moving parts and no replacement parts.

In another embodiment, a vertical hole is provided in the top cap of the device to permit water to flow from the openings in the body of the device and out through the top, where in another embodiment, attached to the underside of the cap of a portable water bottle. The device can be kept permanently inside the water bottle, connected to the underside of the cap of the bottle. This embodiment permits the device to stay in the same position and not move around inside the bottle. Instead, the water is moved around the device as the portable water bottle is shaken.

In yet another embodiment, the absorbing media has significant internal and external surface area to which the anti-bacterial agent is adhered. As water that contains pathogens flows through the treated media inside the housing, in still another embodiment, bacteria such as *E. coli* and other pathogens are deactivated by the colloidal silver contained on and in the media held in the housing.

Embodiments can deactivate about 99.9% of bacteria passing through the portable water treatment device. Therefore, water treated with this device substantially meets World Health Organization standards (www.who.org) for safe drinking water. Such embodiments also recommend colloidal silver levels below the 0.1 mg/L levels which meets Environmental Protection Agency standards (www.epa.org) for human consumption of silver. Bacterial and many other types of pathogens are deactivated by these embodiments.

In one aspect, a method of deactivating bacteria within water is disclosed. The method comprises passing water and bacteria contained in the water around the colloidal silver-treated media contained in the portable water treatment device such that the bacteria is deactivated within a short time. The method also comprises placing the water treatment device inside a water bottle containing contaminated, bacteria-ridden water and shaking the bottle briefly to accelerate the flow of water through the water treatment device. The method further comprises drinking the decontaminated water from the bottle, and refilling the water bottle with contaminated water to repeat the process of bacterial deactivation.

The apparatus, in another embodiment, may be inserted in a pipe, tube, or spigot that is used to deliver water from a water storage tank. Water is stored in large tanks, commonly for many months. During this time, bacteria and other pathogens may form, making the water unsafe for human consumption. Placing the apparatus inside the final delivery spigot or outlet of such a tank would permit the pathogens to be deactivated as they flow out of the tank.

In another embodiment, the apparatus is small enough, and deactivates bacteria rapidly enough, to be effective in a common household water line. Since the apparatus does not rely on physical means to remove bacteria, it will not become clogged as do filers commonly used to treat water. The low cost also permits people with very low incomes to purchase the device.

The method further comprises placing the device in a bottle of contaminated water, swirling the water in the bottle briefly to accelerate the timing of deactivation, drinking the water after a few seconds, and refilling the bottle, and continuing this procedure to provide a substantial volume of safe drinking water in a relatively short period of time.

In another embodiment, the housing containing the media treated with the anti-bacterial agent and mesh liner may be varied in size and shape to adapt to various sized water containers in which contaminated water is placed.

BRIEF DESCRIPTION OF THE DRAWINGS

The objects, advantages and features will be more clearly appreciated from the following detailed description, when taken with the accompanying drawings, in which:

FIG. 1B is a left side view of an exemplary portable, anti-bacterial water treatment device in accordance with one embodiment.

FIG. 11 is an illustration, approximately to scale, of a microporous media coated with colloidal silver next to an illustration, also approximately to scale with the media and silver colloids, of a typical *E. coli* pathogen.

The following detailed description of the preferred embodiments is the best mode of use as currently contemplated. Such description is not intended to be comprehended or viewed in a way that would limit the application to these embodiments alone, but rather as an illustration, and with reference to the accompanying figures, so that those skilled in the art are well informed as to the practical method of use, its features, physical construction, and advantages.

In addition, this patent application is intended to encompass alternative modifications, various related equivalent configurations and methods of use which may be included within the spirit and scope as defined only by the appended claims.

Still further, in the following detailed description, many specific details are presented so as to give a thorough understanding of the various embodiments. However, embodiments may be practiced without these details. In some instances, well known methods, processes, components and physical configurations have specifically not been added in order to present the cleanest, most concise, most easily understood, and most likely practical aspects.

DESCRIPTION OF THE PREFERRED EMBODIMENTS

A detailed description of example embodiments is as follows:

This disclosure relates to methods and apparatuses for rapid and low cost deactivation of harmful microorganisms in contaminated water in conditions under primitive or compromised conditions. Examples of primitive or compromised conditions include emergency relief situations, such as after a flood or earthquake or similar natural disaster, or situations where people are in transit due to military actions, or situations where people are in refugee camps. An official classification of people in conditions like those described above is 'Displaced Persons', and the World Health Organization (www.who.org) estimates there are currently over 40 million people in this category.

The portable pathogen deactivation device contains a microporous medium that is treated with colloidal silver. The colloidal silver is absorbed into the media, and used in concentrations sufficient to deactivate bacteria and other pathogens that are contained in contaminated water. The deactivation of the bacteria like *E. coli* and fecal coliform renders the water drinkable. Also, once deactivated, these bacteria are rendered harmless for human consumption. "Bacteria", as the term is used herein, refers to pathogens, like *E. coli*, fecal coliform, and other similarly sized pathogens that may be deactivated by exposure to colloidal silver.

Figure 1A:
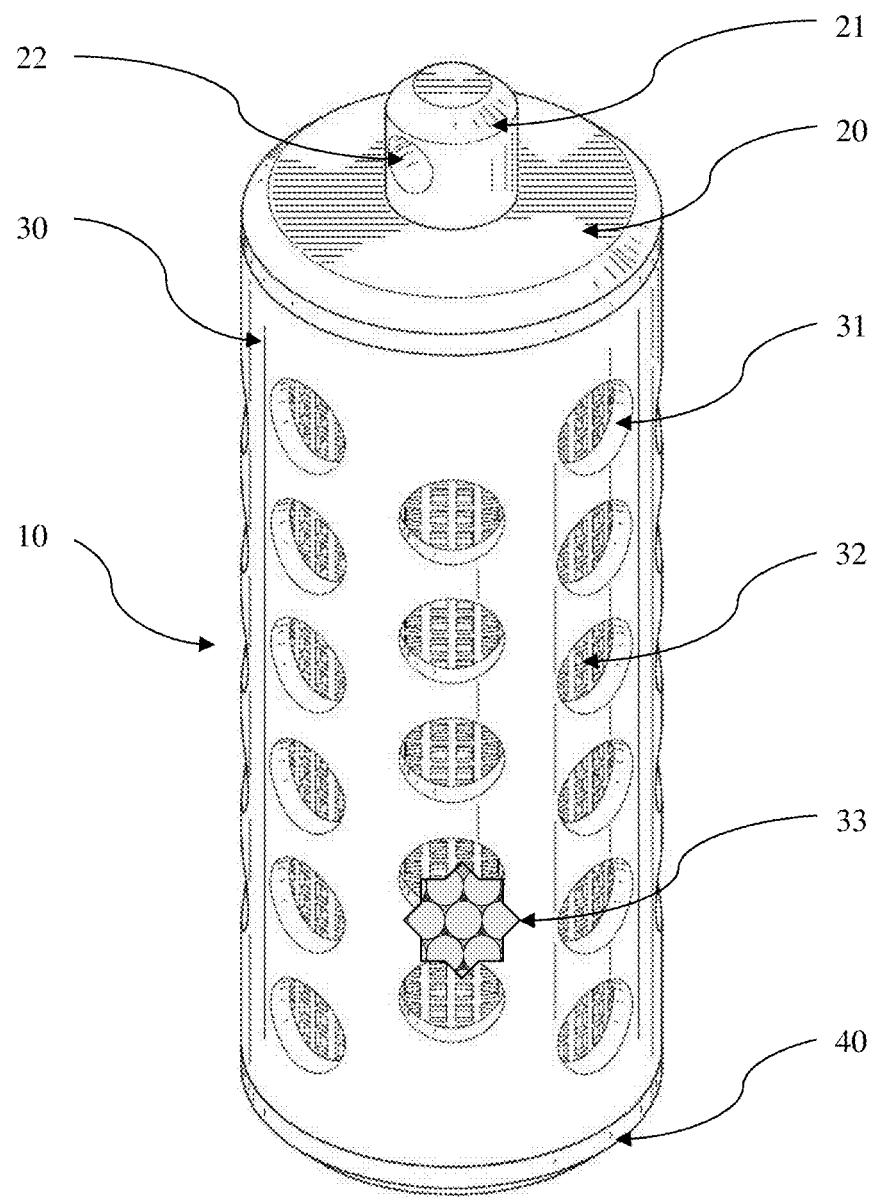
FIG. 1A is an isometric view from the front of one embodiment of an exemplary portable, anti-bacterial water treatment device in accordance with one embodiment.

FIG. 1A shows an example of a portable pathogen deactivation device 10 comprising a canister 30 having a top portion 20 on top of which is mounted a fitting 21 containing a hole 22 through which a lanyard or string can be threaded for ease of carrying. Canister 30 has a bottom portion 40, and holes 31 are provided in the canister 30 to allow the flow of water through the device. Located in canister 30 is a quantity of media 33, shown in an exploded view, that have been treated with colloidal silver, the media retained in the canister by a screen material 32. The materials used to produce device 10, including canister 30, top portion 10, fitting 21, bottom portion 40 and the screen 32 may be a typical polymer plastic such as polycarbonate, acrylic, or other durable and lightweight materials that are inert in aqueous solutions including water. Plastics that can be injection molded may be desirable, as this manufacturing method can deliver high volumes of the device at low cost and with high quality and geometric precision. Also, injection molded plastics may be highly impact resistant, permitting the portable deactivation device to withstand considerable physical abuse without compromising its performance in deactivating bacteria over long periods of time.

Figure 1C:
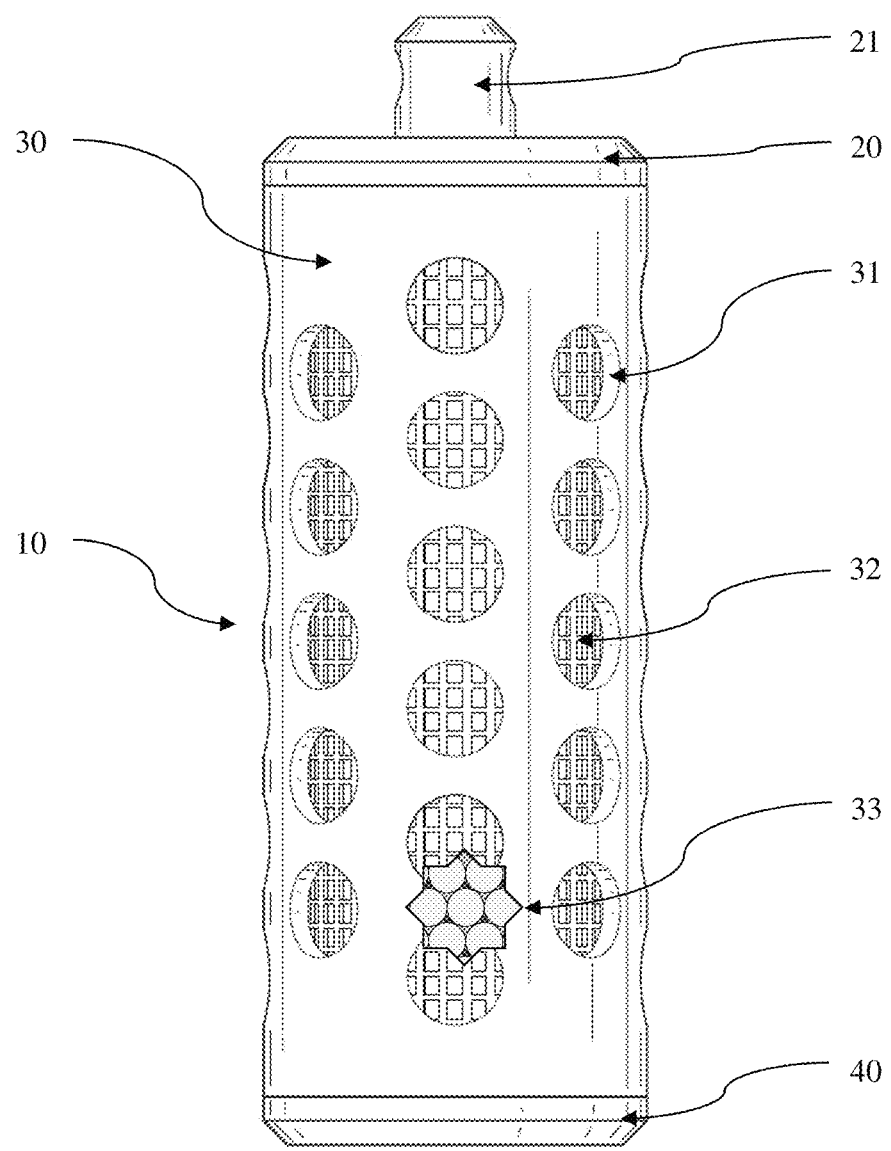
FIG. 1C is a front view of an exemplary portable, anti-bacterial water treatment device in accordance with one embodiment.
Figure 1D:
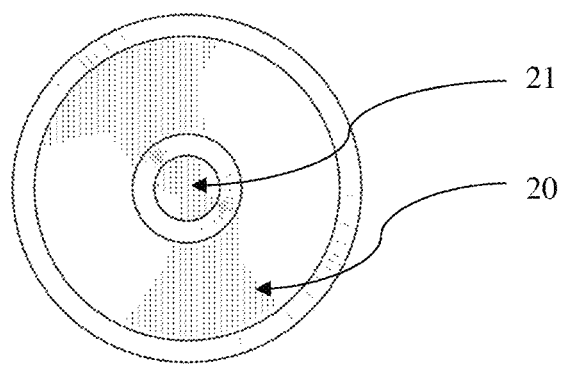
FIG. 1D is a top view of an exemplary portable, anti-bacterial water treatment device in accordance with one embodiment.
Figure 1E:
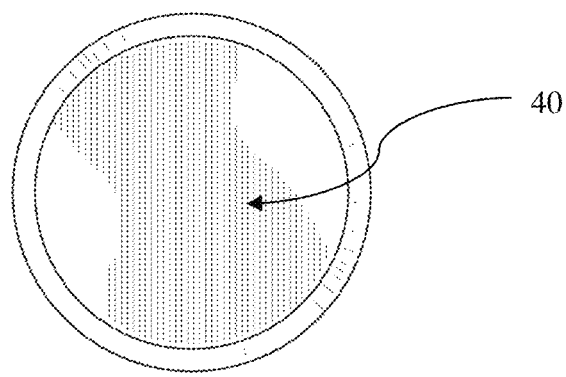
FIG. 1E is a bottom view of one embodiment of an exemplary portable, anti-bacterial water treatment device.

FIG. 1B shows the bacterial deactivation device of FIG. 1A in a left side view, and FIG. 1C shows the bacterial device of FIG. 1A in a front view. FIG. 1D shows a top view of the bacterial deactivation device of FIG. 1A, illustrative the top portion 20 and fitting 21. FIG. 1E shows a bottom view of the bottom portion 40 of the bacterial deactivation device of FIG. 1A.

Figure 2:
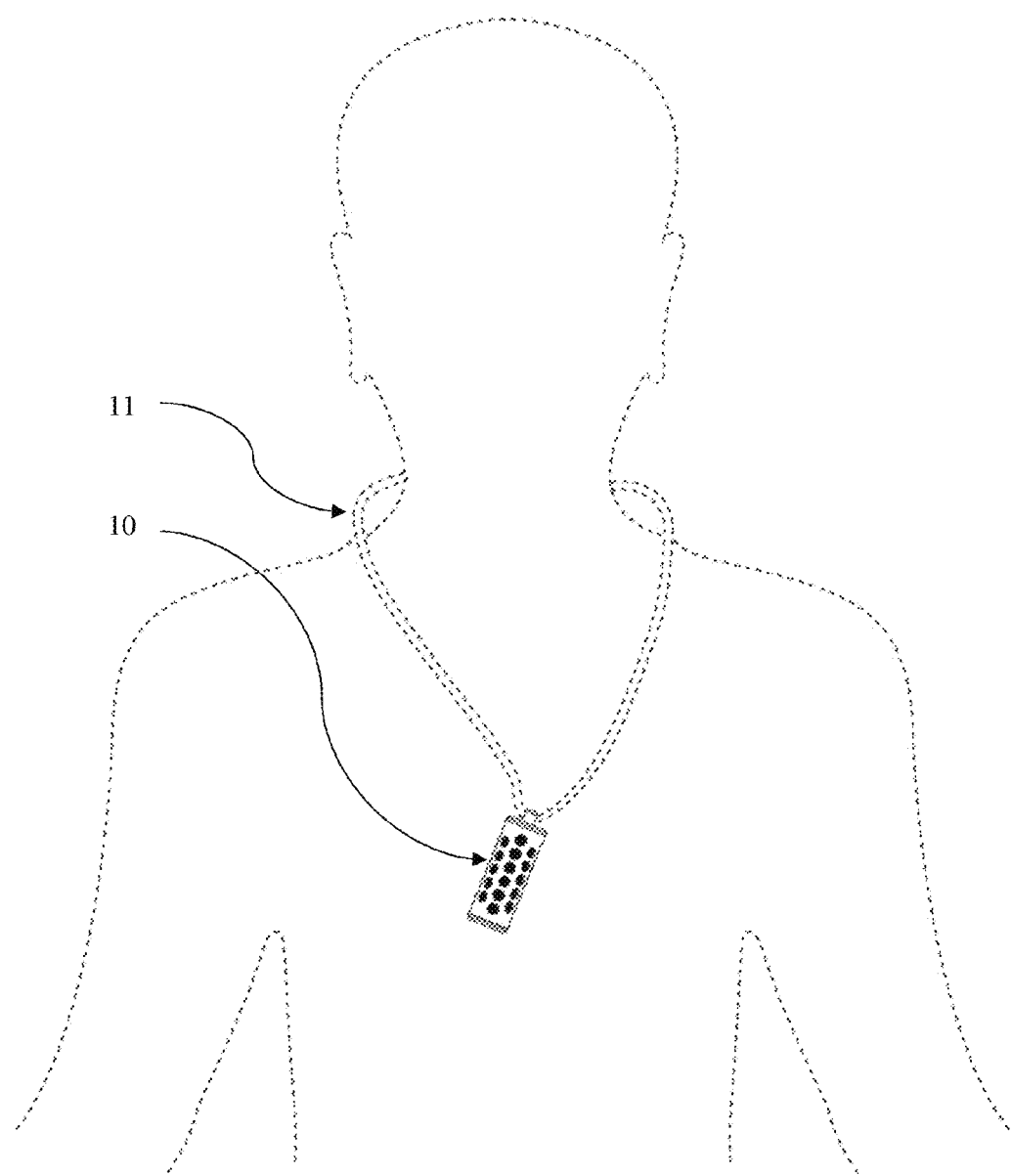
FIG. 2 is an isometric view of one embodiment of an exemplary portable, anti-bacterial is water treatment device.

FIG. 2 shows bacterial deactivation device 10 with lanyard 11 threaded through fitting 21 to permit a person to easily carry the device around a person's neck.

In another embodiment, the apparatus is carried on a person, with the use of a lanyard, clip, belt holder, keychain, or similar method to permit easy and simple portability.

Figure 3:
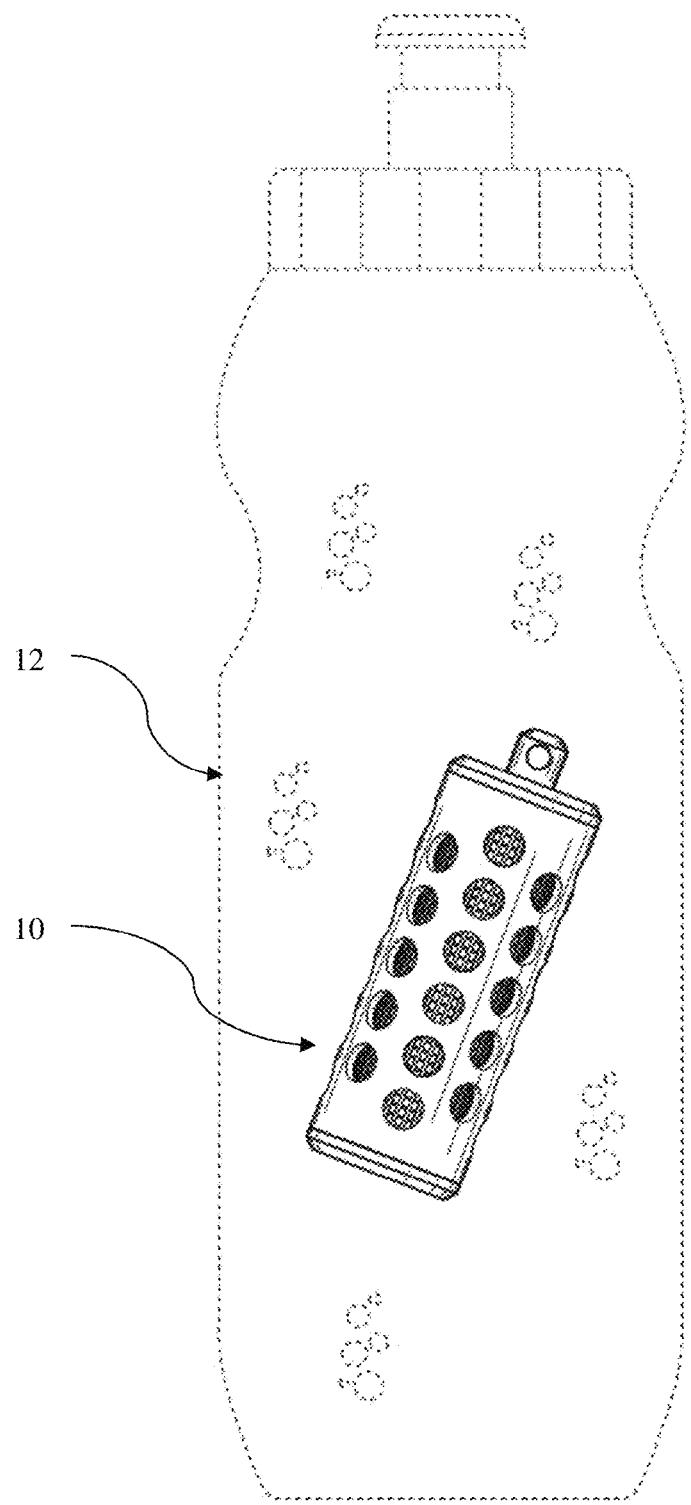
FIG. 3 is a side view of one embodiment of an exemplary portable, anti-bacterial water treatment device.

FIG. 3 shows the bacterial deactivation device 10, in actual size, inside a typical plastic water bottle 12. A feature of this method of transporting and using the bacterial deactivating device is that it is easy to carry a small drinking water bottle, and continue to refill the bottle with contaminated water that is quickly made drinkable by having the device kept in the bottle. In a preferred embodiment, all the bacteria in the water poured into the bottle is deactivated by the time it takes to fill the bottle and screw on the cap to the bottle, typically 7-8 seconds. The mild motion of the water swirling around and through the bacterial deactivation device is sufficient to deactivate all the bacteria. Testing has shown that the bacterial deactivation device, with an appropriate silver concentration, can effectively kill all the *E. coli* in a gallon of water in less than 15 seconds with mild agitation of the water.

Figure 4A:
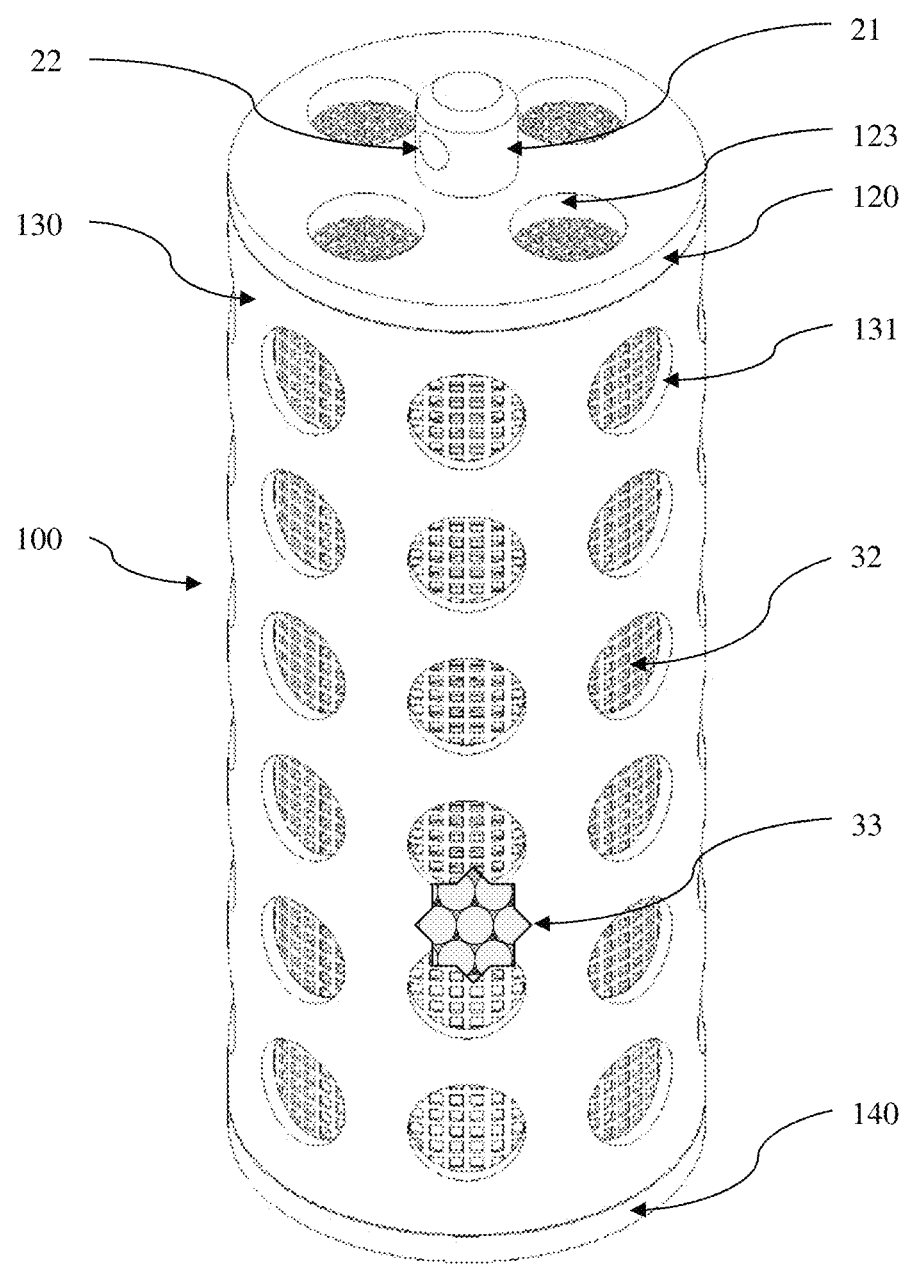
FIG. 4A is an isometric view of one embodiment of an exemplary, enlarged volume modification of a portable anti-bacterial device.
Figure 4B:
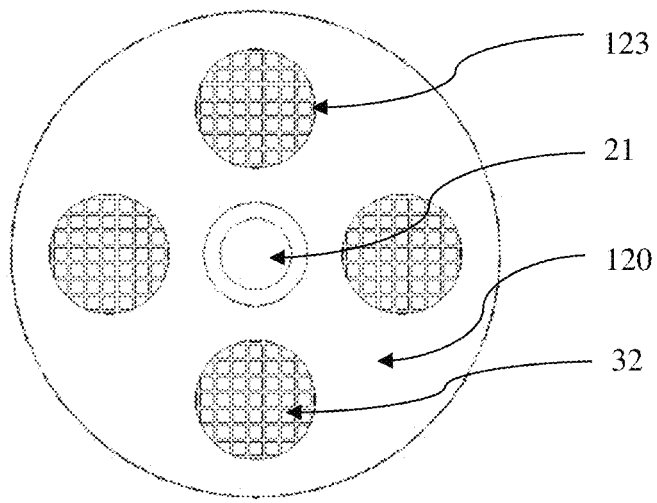
FIG. 4B is a top view of one embodiment of an exemplary, enlarged volume modification of a portable anti-bacterial device.
Figure 4C:
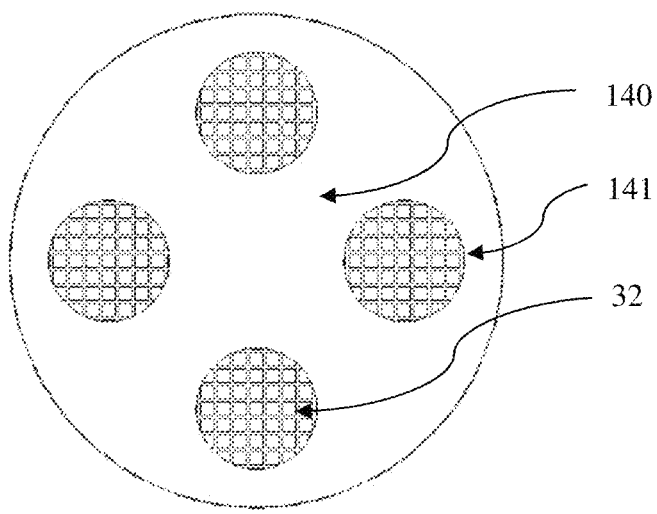
FIG. 4C is a bottom view of one embodiment of an exemplary, enlarged volume modification of a portable anti-bacterial device.

FIG. 4A shows bacterial deactivation device 100 where the top portion 120 has holes 123 to permit increased flow and more rapid deactivation times. FIG. 4B shows a top view of the device of FIG. 4A, and FIG. 4C shows a bottom view of the device of FIG. 4A.

Figure 5A:
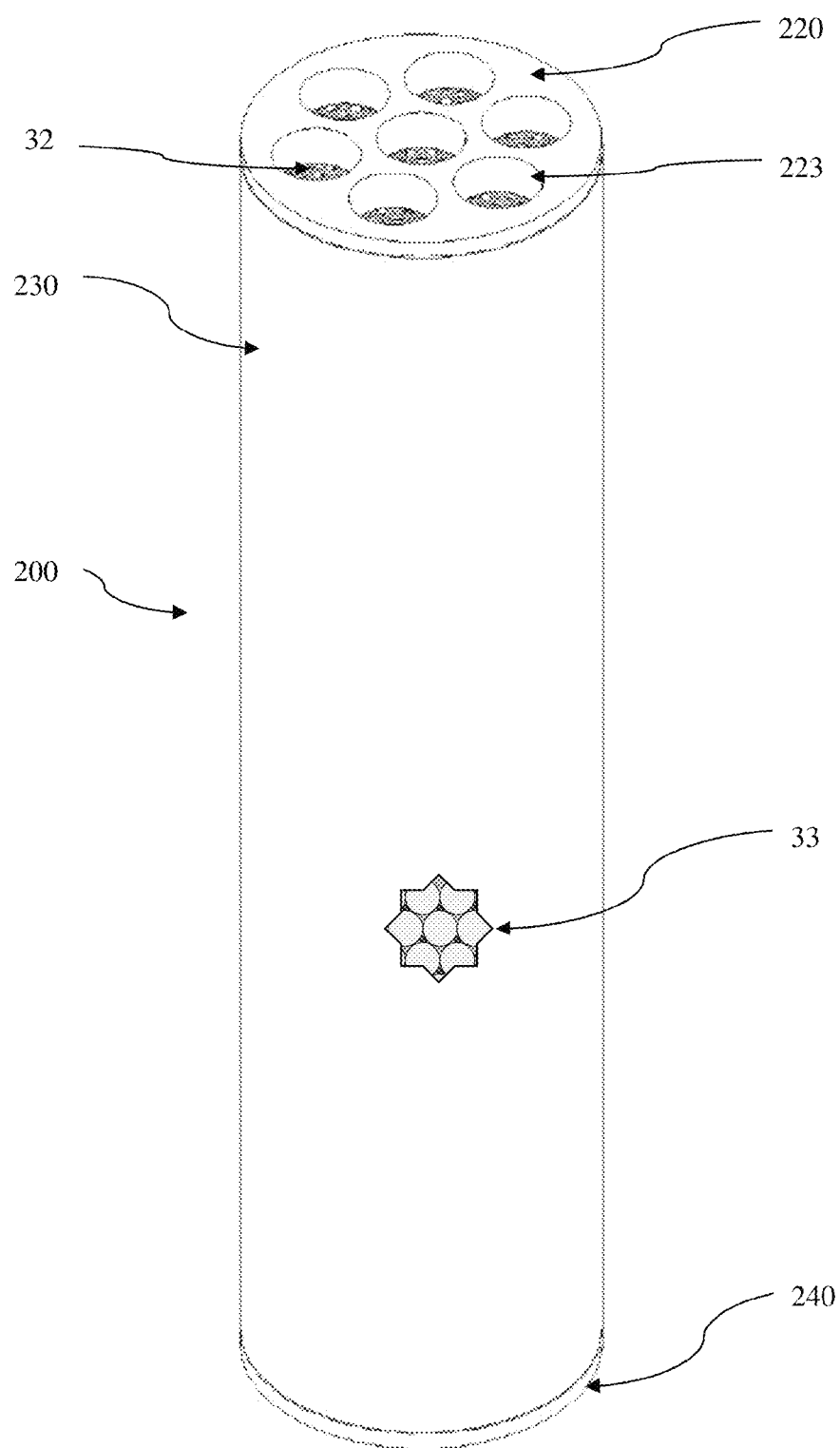
FIG. 5A is an isometric view of one embodiment of an exemplary, enlarged length modification of a portable anti-bacterial device.
Figure 5B:
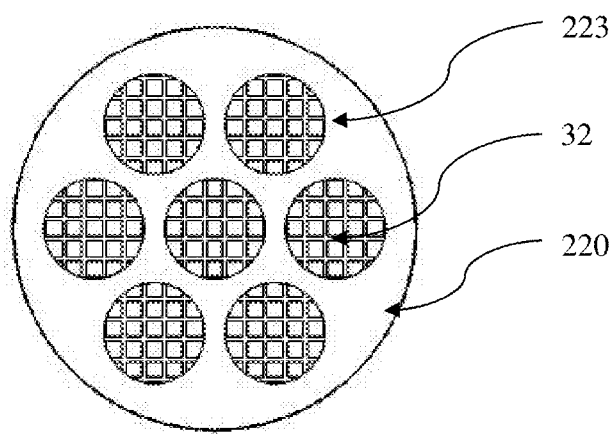
FIG. 5B is a top view of one embodiment of an exemplary, enlarged length modification of a portable anti-bacterial device.
Figure 5C:
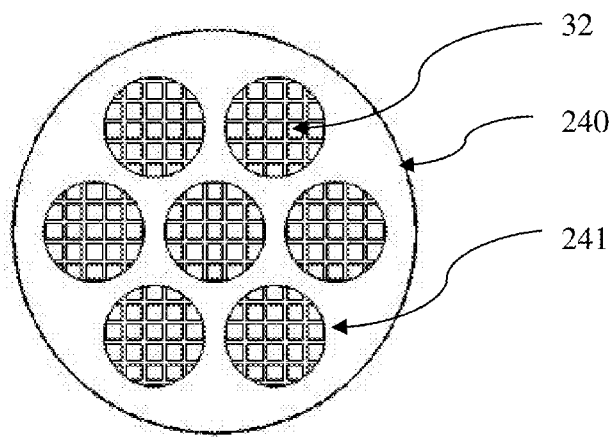
FIG. 5C is a bottom view of one embodiment of an exemplary, enlarged length modification of a portable anti-bacterial device.

FIG. 5A shows bacterial deactivation device 200 comprising canister 220, top portion 220 and bottom portion 240, and an exploded window view 33 of the media inside canister 220. The primary feature of this version of the bacterial deactivation device is a design that allows the device to be easily inserted 'in line' in a tube or other plumbing line with water flowing continually through the plumbing line and the bacterial deactivation device. FIG. 5B is a top view, and FIG. 5C a bottom view, of the bacterial deactivation device of FIG. 5A. Screen 32 is used to retain the media inside device 200.

Figure 6A:
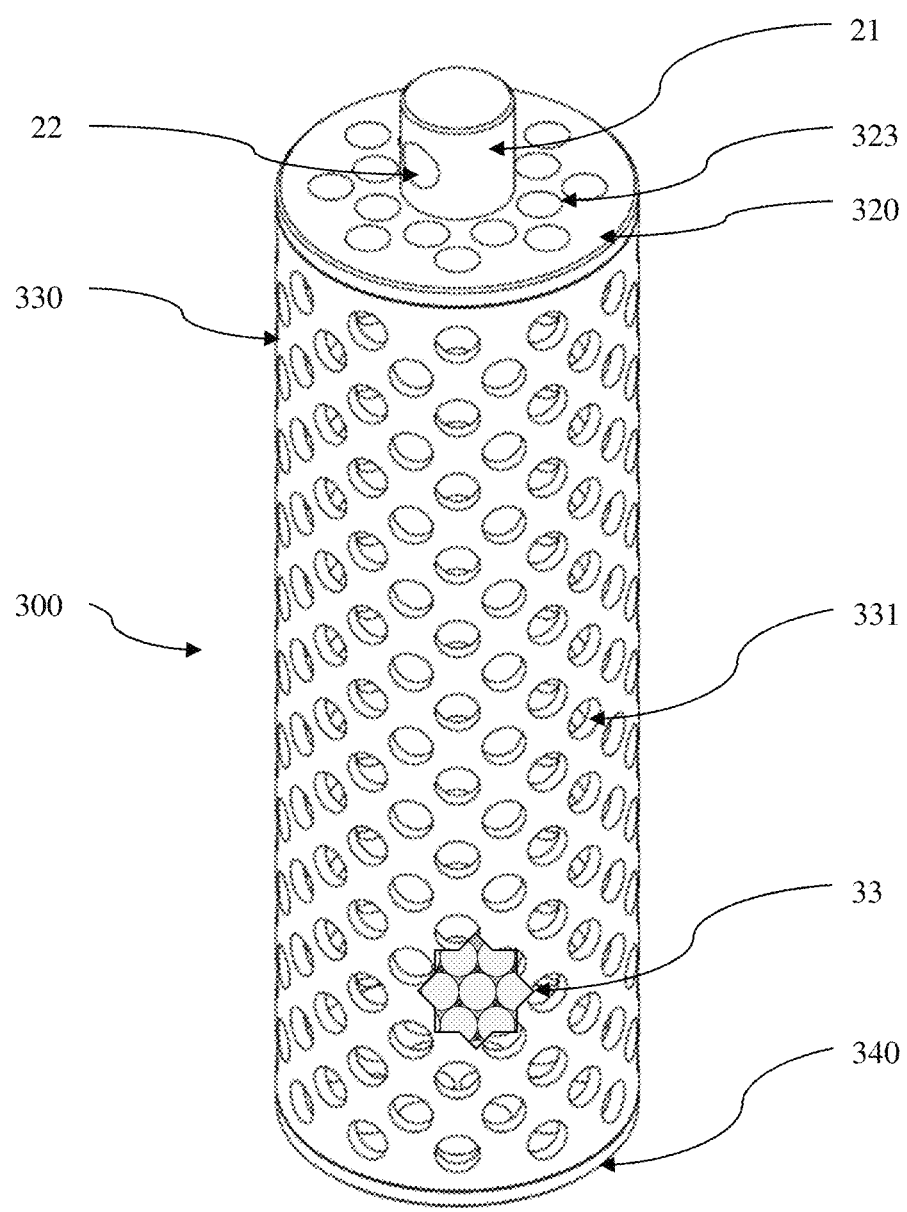
FIG. 6A is an isometric view of one embodiment of an exemplary, hole-optimized version of a portable anti-bacterial device.

FIG. 6A shows bacterial deactivation device 300 wherein canister 330 is perforated with holes 131, and having a top portion 120 containing a fitting 21 and hole 22 for threading a lanyard or string for easy portability. Bottom portion 140 is attached to canister body 330 after the silver-treated media 33, shown in exploded view, is poured into canister 330. The bottom portion 140 is then sealed onto the bottom of the canister 330, and the entire deactivation device is now fully sealed and ready to be used. It never needs re-charging, re-activating, or any maintenance or replacement parts, but will deactivate bacterial and other pathogens in contaminated water for several years of continuous use.

Figure 6B:
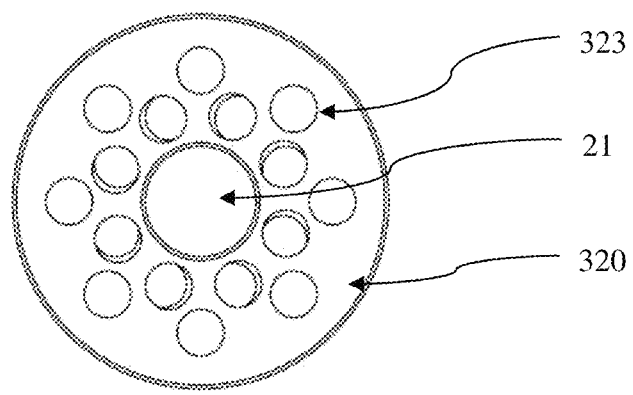
FIG. 6B is a bottom view of one embodiment of an exemplary, hole-optimized version of a portable anti-bacterial device.
Figure 6C:
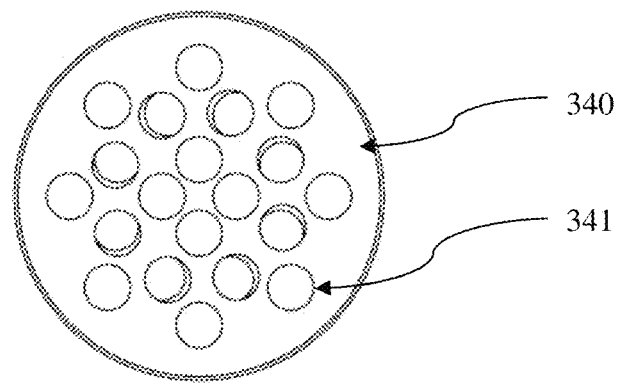
FIG. 6C is a bottom view of one embodiment of an exemplary, hole-optimized version of is a portable anti-bacterial device.
Figure 6D:
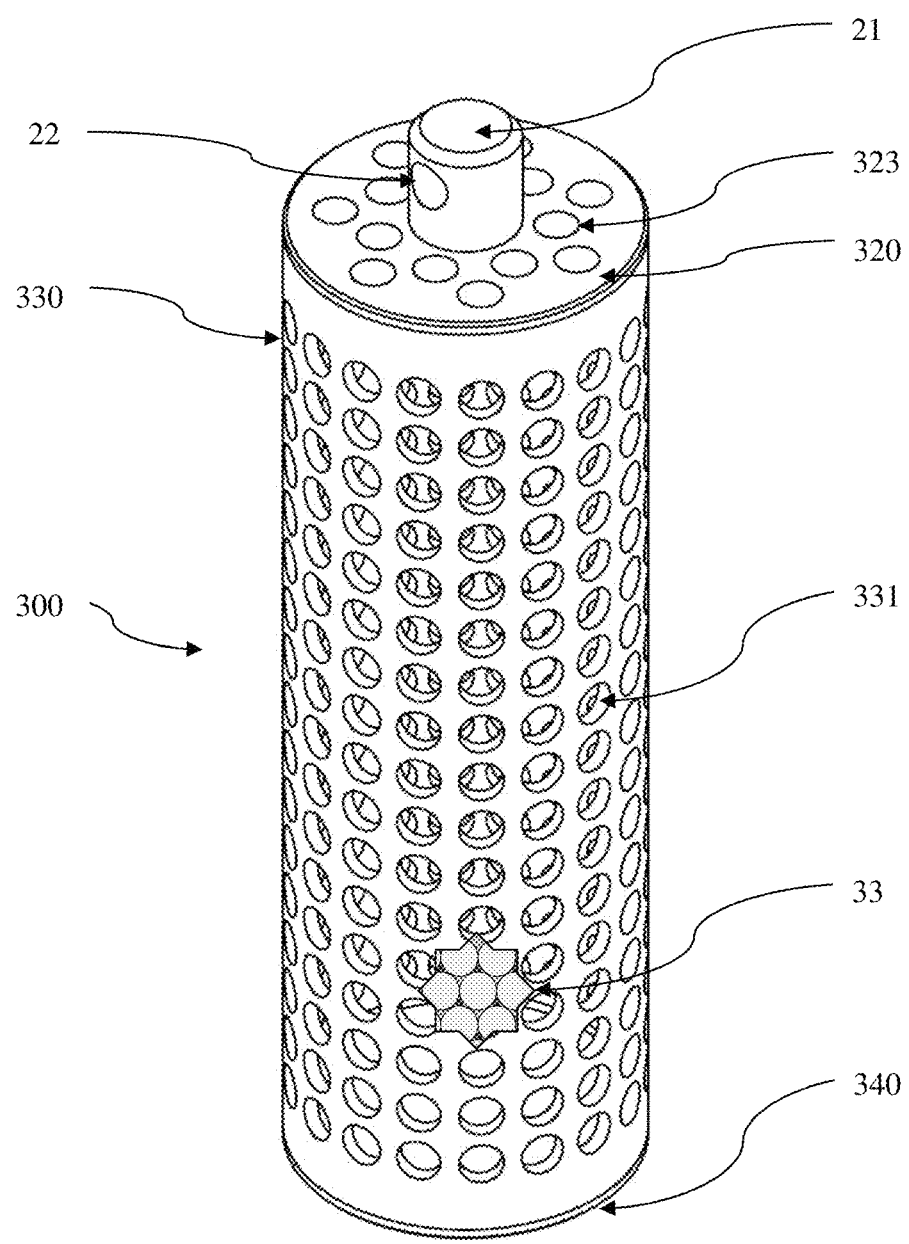
FIG. 6D is an isometric view of one embodiment of an exemplary, hole-optimized version of a portable anti-bacterial device.

FIG. 6B is a top view, and FIG. 6C a bottom view, of the bacterial deactivation device of FIG. 6A. Note the large number of holes 223 and 241, a feature to increase the flow of water through the device and in doing so, shorten bacterial deactivation times. FIG. 6D is an isometric view of the bacterial deactivation device featuring rows of holes that match each other around the device, as opposed to FIG. 6A where the rows were offset. The version in FIG. 6D as a result of a different arrangement of the holes has a greater number of holes for the contaminated water to flow through. This is expected to result in faster de-activation times of *E. coli* microorganisms.

Figure 7A:
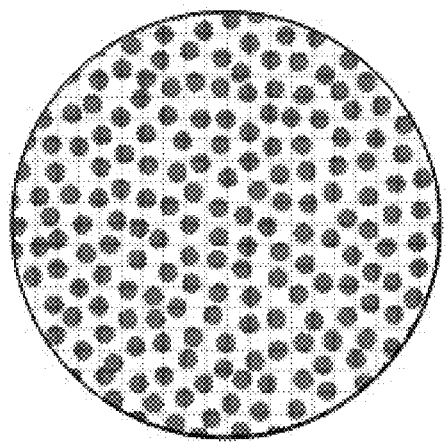
FIG. 7A is an illustration, taken from actual filter paper used in counting bacteria, of the number of *E. coli* microorganisms found in a control sample of contaminated water before being passed through non-silver-treated media.
Figure 7B:
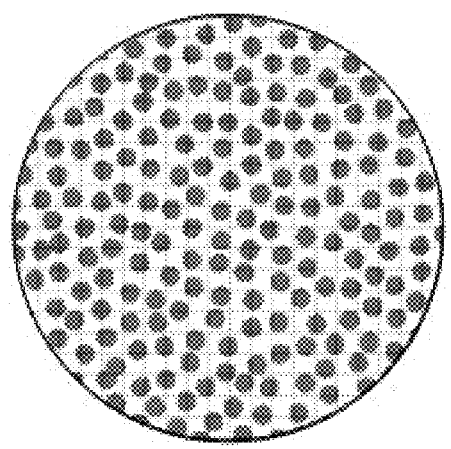
FIG. 7B is an illustration, taken from actual filter paper used in counting bacteria, of the number of *E. coli* microorganisms found after being passed through non-silver-treated media.

FIGS. 7A and 7B are graphic representations of the result of a bacterial measurement test. FIG. 7A shows the number of bacterial colonies in the control sample, and FIG. 7B shows the number of bacterial colonies that were counted after the contaminated water in the control sample was processed through the bacterial deactivation device. It was recorded that the same number of colonies were counted in the control and in the sample processed through the bacterial deactivation device with the non-silvered media, establishing the fact that the bacterial deactivation device is not a filter, ie, does not remove bacteria by mechanical means.

This test has been repeated several times to provide statistically significant data to establish the fact that the bacterial deactivation device does not substantially remove bacteria by is a filtering, mechanical means. In other words, it is not acting as a filter.

Figure 8A:
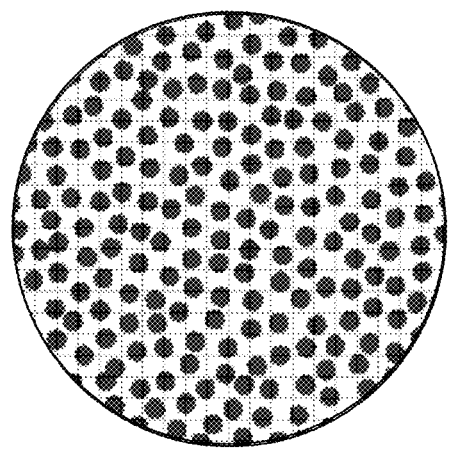
FIG. 8A is an illustration, taken from actual filter paper used in counting bacteria, of the number of *E. coli* microorganisms captured and incubated on a test filter according to the World Health Organization approved test to measure bacterial in drinking water.
Figure 8B:
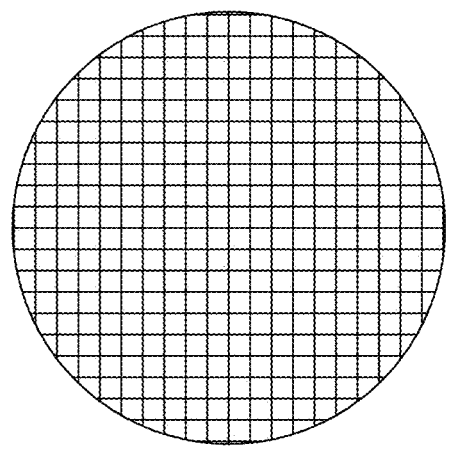
FIG. 8B is an illustration, taken from actual filter paper used in counting bacteria, of the number of *E. coli* microorganisms remaining after being treated for 30 seconds with one embodiment of the portable, anti-bacterial water treatment device according to the present invention.

FIG. 8A shows graphic representation of bacterial colonies counted in a control sample, and FIG. 8B shows the result of the same water passed through the bacterial deactivation device were the media was treated with colloidal silver, a standard condition for the device. Note that 100% of the *E. coli* colonies have been deactivated as shown in FIG. 8B. This is in conformance with the World Health Organization (WHO) specification for safe drinking water.

Figure 9:
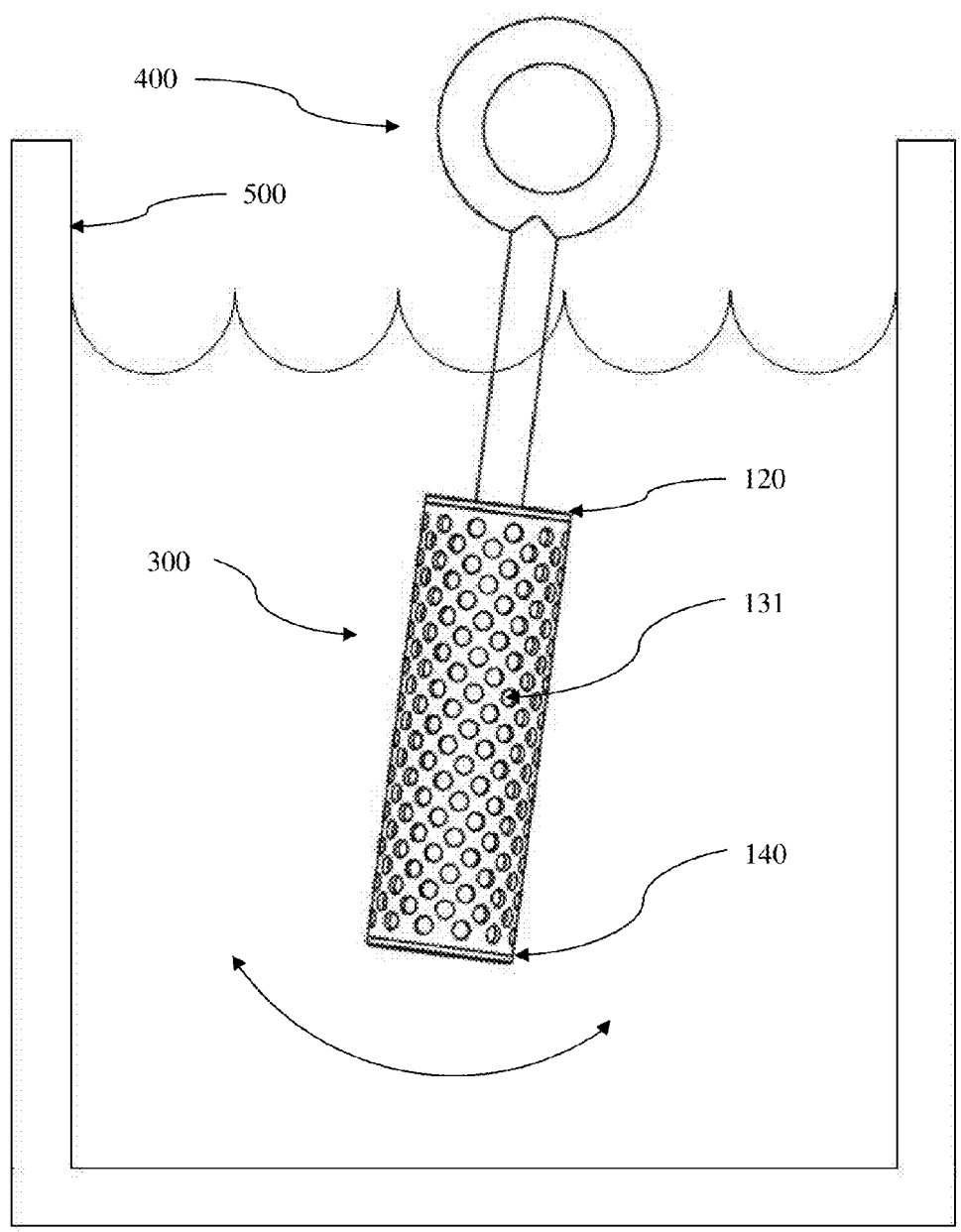
FIG. 9 is a side view of one embodiment of a portable anti-bacterial water treatment device according to the present invention.

FIG. 9 shows an example of a portable pathogen deactivation device 300 comprising a handle 400 to permit stifling the device in a container 500 of contaminated water. The device is stirred in the water container for several seconds, or enough time to deactivate all the *E. coli* microorganisms. For example, in a one liter volume of water, all of the microorganisms are typically deactivated within 10 seconds using the preferred operating parameters for preparing the silver-treated media described in detail in this specification. The device 300 has the same approximate configuration in terms of hole size 131, top cap 120 and bottom cap 140 as shown in FIG. 6A.

Figure 10:
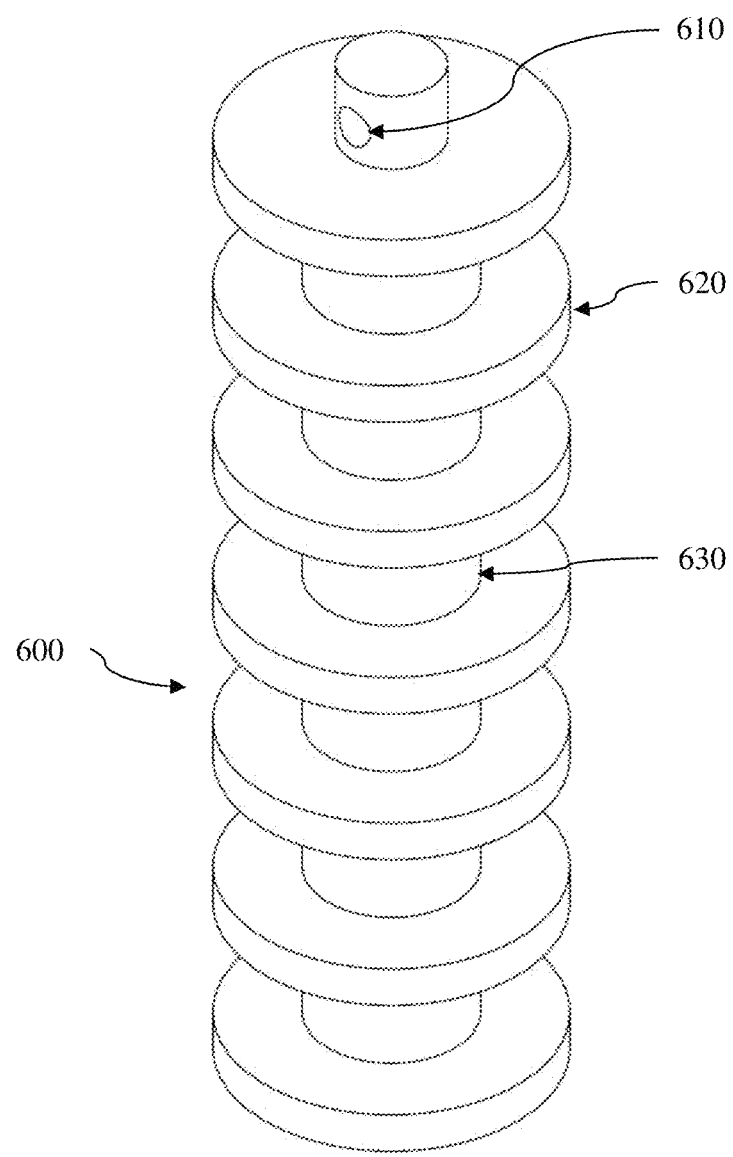
FIG. 10 is a side view of one embodiment of a portable anti-bacterial water treatment device according to the present invention.

FIG. 10 shows another embodiment of an anti-pathogen device 600 with provision for stringing a lanyard through hole 610 to permit a person to carry the device around their neck. The device is shaped with cylindrical ties 620 along a central core 630 to permit a high degree of surface area for the subsequent deposition of ionic silver. The shape and thickness of the ties 620 may be varied to increase surface area further, and the length of device 600 may also be varied to provide more surface area for deposition of ionic silver, thereby increasing the anti-bacterial action of the device.

The various types of microporous media tested in the portable device are optimized for porosity and size so they provides maximum absorption of colloidal silver as well as high flow, while providing adequate residence time for deactivation of bacteria passing therethrough. It is preferred that a pore size of the microporous media be at least ½ the size or even smaller than, the pathogen to be treated. This ensures that the deactivated pathogen will not be taken up into is the pores of the media or otherwise absorbed by the media.

Synthetic zeolite is one suitable microporous media. The lattice structure of zeolite can be described as a cage, honeycomb, or 3D framework, and may be built of $SiO_4$ and $AlO_4$ tetrahedra linked by sharing oxygen atoms to form intra-crystalline cavities and channels of molecular dimensions that are much smaller than the dimensions, of say, an *E. coli* pathogen, so that the *E. coli* will contact the zeolite lattice to be deactivated but without being taken up in to clog the zeolite lattice. (Reference: http://www.asdn.net/asdn/chemistry/zeolites.shtml)

In another embodiment, the media, in this case, zeolite, has a negative charge, opposite that of the silver, allowing the silver to become strongly held onto the lattice structure of the zeolite.

FIG. 11 is an approximately scaled drawing of a zeolite media, with the silver ions on the surface thereof, and a typical *E. coli* pathogen. The inherent negative charge of the zeolite attracts and holds the silver ions to its surface. Zeolite is an inorganic crystalline porous material with a highly ordered structure. Zeolites are generally composed of silicon (Si), aluminum (Al), and oxygen (Camblor et al, 1998). Conventional production methods result in zeolites with dimensions on the scale of 1 to 10 um, but nanoscale zeolites, with discrete, uniform crystals, have dimensions on the scale of 5 to 100 nm (nanometers). Nanocrystalline zeolites exhibit significant surface area which is important to allow for a greater density of ionic silver. Further, by altering the ratio of aluminum to silicon in manufacturing, the ion exchange properties can be raised or lowered to optimize both the bonding and density of ionic silver. (Ref: Environ Sci Pollut Res (2013) 20:1239-1260.)

It is suspected that the negatively charged *E. coli* are attracted to the positively charged silver ions which are bonded to the surface of the zeolite. Due to the significant size difference, cannot possibly be absorbed into the microporous media, but pass between and around the surfaces of the media, and become deactivated in the process. There is no filtering action in this mechanism, thereby avoiding the problems of clogging and flow restriction of prior art devices.

Typically zeolites may have surface area with an extensive electrostatic negative charge. Zeolite is commonly referred to as "molecular sieve" for its ability to sort molecules based on size and electrochemical charge. Zeolite's negatively charged CEC, cation exchange capacity, holds positively charged cations through its open cage structure. It may be likened to a magnet, attracting cations and holding them onto the structure. The higher the CEC, the stronger the attraction, and therefore more cations can be held onto the cages. Zeolite's negative charge and cation exchange capacity is a benefit for the device because ionic silver, the cation, is positively charged, allowing a large amount of to become strongly held to the lattice structure of the zeolite. (Reference: http://www.dioxincleansing.com/whatiszeolite.htm).

In one embodiment, the cation in the zeolite is sodium. Other cations may also be present in other embodiments of the media used in the antibacterial device, such as potassium or magnesium.

The zeolite's ability to attract and hold cations, specifically ionic silver, allows the device to hold its integrity over a long period of time without letting the silver be rinsed away by the contaminated water or other environmental effects. The zeolite's enhanced cage structure also allows a large surface area to hold silver and contact more *E. coli* in the contaminated water.

Certain bacteria, specifically *E. coli*, have been proven to have a negative charge. It is commonly known that large populations of cells maintain a negative charge within their cell membranes. However, a study at Harvard University also showed that individual *E. coli* create their own electrical spikes and maintain a negative charge. *E. coli* accomplish this by pumping charged ions, i.e. sodium and potassium etc., through their cellular membranes (http://www.livescience.com/15057-ecoli-electricity-voltage-blinking-visualization.html).

True colloidal silver is a colorless liquid containing micro-clusters of silver too small to reflect light back to the human eye. Residence time is the amount of time a given bacteria is is exposed to the ionic silver to permit its deactivation. Colloidal silver is non-toxic to all living things, including mammals, plants and reptiles that are not of a one-celled nature. In other words, the action of the colloidal silver is only effective on single-celled living things, like bacterial and viral pathogens. Researchers have found that several hundred types of bacterial and viral pathogens are affected by the action of ionic silver. (Ref: Materials Research Innovations, 2007, Vol. 11, No. 1)

Single-celled organisms employ a method of taking in oxygen, or oxygen metabolism that is very different from multi-celled organisms. The colloidal silver acts as a catalyst in deactivating bacteria by crippling the oxygen-metabolism enzymes, or chemical lung, of these organisms that keep them alive. As a result of this, the microorganisms suffocate and die within a few seconds. Dead bacteria are naturally removed from the body by the immune and lymphatic system.

Body tissues having 5 parts per million of colloidal silver will be free of vium, fungus, and bacterium. Silver particles are long lived in the body because they do not enter into a reaction, but just catalyze other reactions, specifically the deactivation of enzyme reactions that provide the oxygen to pathogens like *E. coli*, and in doing so, 'shut down' the pathogens by suffocation. (Reference: Dr. Anton Cloete, courtesy of the Revival Noon of Natural Health, P.O. Box 1601, Highlands North 2037, Johannesburg, South Africa).

Figure 12A:
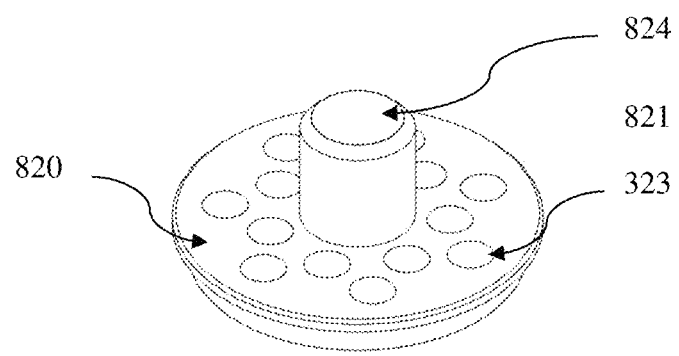
FIG. 12A is an isometric view of the top cap of the antibacterial device.
Figure 12B:
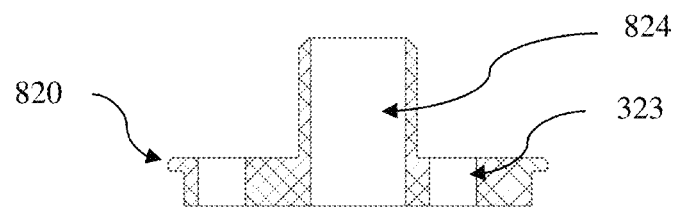
FIG. 12B is a side view of the top cap of the antibacterial device.

FIG. 12A shows the top cap 820 of the device where a hole 824 is drilled through the stem 821 to permit water to flow out of the device and into the mouthpiece of a portable water bottle. FIG. 12B is a side view to illustrate this feature where the hole 824 is shown in the middle of the cap, and adjacent holes 323 are the inlet holes where contaminated water enters the device.

In an embodiment, the deactivation rate of the silver-treated media is adjusted by changing the concentration of the silver solution. For example, a typical deactivation rate test result shows that the control sample of contaminated water containing as many as 4,500 colonies of *E. coli* microorganisms. After a few seconds of exposure of the device in the contaminated water, the number is significantly reduced. After 15 seconds, according to the data in the table below, all of the microorganisms are deactivated.

The openings in the canister containing the media are likewise optimized on the basis of extensive testing to provide rapid flow of contaminated water through the canister for efficient bacterial deactivation, yet still providing adequate residence time for the pathogens to be exposed to the silver ions and thereby be deactivated.

Various factors must be taken into consideration in making a portable bacterial deactivation device according to the teachings herein. These factors include the following: colloidal silver concentration, the type of media used, the geometric dimensions of the media used, the porosity of the media used, the method employed in treating the media with colloidal silver, the geometric dimensions of the media container, the chemical reactivity of the material used to make the media container, and the structural integrity of the media container.

As mentioned above, colloidal silver concentration is a factor that may be considered in designing a portable anti-bacterial device. Applying too much colloidal silver to a media of a bacterial deactivation device may result in treated water that does not meet Environmental Protection Agency standards for the consumption of silver. Applying too much colloidal silver may also make the cost of the portable anti-bacterial device to high and restrict its access to people most in need of safe drinking water. On the other hand, applying too little colloidal silver may allow substantial amounts of bacteria to remain active even after the prescribed residence time in the portable anti-bacterial device. Applying too little colloidal silver may also require subsequent reapplication of colloidal silver to maintain the deactivation device in working form. An appropriate amount of colloidal silver can provide a deactivation device that deactivates substantially all bacteria passing therethrough without ever requiring the reapplication of colloidal silver.

In an embodiment, the silver solution used to treat the absorbing media is prepared is according to the following procedure:

1. Obtain 18 g of 4.75 mm spherical diameter zeolite
2. Pour 50 mL of distilled water into 300 mL beaker
3. Add 2.5 mL of $AgNO_3$ to the distilled water
4. Add the zeolite to the solution
5. Let sit for 60 minutes
6. Strain the zeolite out from the solution
7. Allow zeolite to dry for 24 hours or until it is completely dry The material selected for the media inside the canister will affect the residence time for the silver to deactivate the bacteria, as well as the cost of the resulting portable device. By way of example, zeolite is a low cost, porous medium that can be used as the media and as the absorbing material for the colloidal silver. It is readily available, and when used according to some methods as described herein, will quickly and repeatedly deactivate E. coli and coliform bacteria and many other pathogens that can be found in contaminated water, and will render that water safe to drink.

Molecular sieve is a material that internally has very small holes of precise and uniform size. These holes are microporous structures small enough to block large molecules and other solid materials that could clog the media, but small enough to allow small molecules and colloidal silver to pass. Externally, the size of the molecular sieve can range in diameter from ~1.5 mm to several millimeters.

The external geometry of the media may affect its functional characteristics. By way of example, the flow rate and resulting residence time for media with an external diameter of 1.5 mm will deactivate bacteria at a rate different than media with an external diameter of 4.75 mm, due primarily to the flow rate of the contaminated water through the media. Media that is smaller in diameter typically takes longer to allow a given volume of water pass through than is media that is larger in diameter.

In another embodiment, the physical properties of the media being treated with the ionic silver or colloidal silver solution are as follows: The media has a physical size and shape of approximately 4.75 mm spherical diameter, a pore size of 10 Å, and a density of 43 $lb/ft^3$.

Other media, such as some forms of carbon, silicon and silicon oxides, ceramics and naturally occurring porous materials such as volcanic rock, may have excellent properties for use a media in a portable anti-bacterial device. It is therefore to be appreciated that many other materials may also be used effectively as media to contain the colloidal silver, so the disclosed materials are meant as examples only.

In another embodiment, the media that is treated with the colloidal silver solution may be taken from a variety of types of absorbing materials, such as granular activated carbon (GAC), sand, porous ceramic fired from red or white clay, diatomaceous earth, or other porous materials.

The configuration of the receptacle, previously referred to as the canister, may also affect the functional properties of a deactivation device. For example, some embodiments may provide for a longer receptacle, which can provide a larger volume of silver treated media. A greater volume of treated media, with respect to a fixed volume of water, will result in more rapid deactivation times, as more bacteria are exposed to the treated media for a given amount of time.

The receptacle or canister may, for example, be configured with a variety of different hole sizes in its sidewalls, and in its top and bottom covers. The size of the holes typically is small enough to contain the media, so none of the media can escape the receptacle. The functional characteristics of the portable deactivation device may change according to both the size of the holes in the receptacle, and the size or diameter of the media used inside the receptacle. The media itself may vary in both surface area and porosity, and these parameters may affect the functional characteristics of the device. It is to be appreciated that altering one functional characteristic may impact the other characteristics in ways not mentioned above.

In another embodiment, a rod of the silvered media is used to deactivate microorganisms. In this case, the device is fabricated from a solid rod of the media into a specific shape to permit the use without the need of a housing or protective cover. For example, the device may be 2-3 in in length, and have a diameter of ½ in. This is then treated with the colloidal silver solution. After being rinsed in water, this silvered media device is ready to be used in the recommended manner for deactivation of contaminated water.

In another embodiment, the device is placed in a 500 ml water bottle containing contaminated water and shaken, mixed, or stirred. After 30 seconds of exposure to the device, the person with this bottle can drink the water now having fully deactivated the microorganisms. The bottle can now be re-filled with contaminated water, and the procedure repeated as many times as is needed to provide safe drinking water for every person carrying a water bottle with the device.

In another embodiment, the device can be placed in larger or smaller water containers filled with contaminated water with the exposure time modified respective to the size of the container. The device can be dipped, swirled, shaken, mixed, stirred or a similar method to move the device throughout the contaminated water to deactivate the microorganisms.

In another embodiment, the device is placed in a water delivery line so that pathogens may be deactivated between a household water source, such as town water or a well, and the kitchen sink. Depending on the water pressure and flow rate, it may be advisable to use a flow restrictor in the water line so that the water, and specifically pathogens in the water, have sufficient residence time to be completely deactivated. Alternatively, the device used in this application may be elongated so that a flow restrictor is not needed.

In another embodiment, the device is adapted to the spigot of a water storage tank so that all water taken from the tank is allowed to flow at a rate that permits complete deactivation of pathogens. In water storage tanks, bacteria may form as the water is stored for prolonged periods.

In another embodiment, multiple devices are placed in known contaminated water source, such as well, the devices being held on a string from the top of the well, and periodically moved through the water prior to taking water from the well to permit more efficient deactivation.

EXPERIMENTS

During our testing process we have experimented with multiple materials, volumes, shaking times, etc. Three recent experiments are displayed below with their purpose, results, and discussion of results.

Zeolite Sizes:

The purpose of this experiment was to determine if different zeolite sizes have a different impact on the number of E. coli colonies deactivated over 10 trials at a 60 second shaking time. A trial represents a water bottle being refilled with contaminated water.

TABLE 1

Results from Zeolite Sizes
E. coli counts (CFU/100 ml)

| | Control Effluent | 4.75 mm Treated | 2.4 mm Treated | 1.4 mm Treated |
|---|---|---|---|---|
| Trail 5 | 3100* | 0 | 0 | 1000** |
| Trial 10 | — | 0 | 0 | 2600* |
| Average | 3100* | 0 | 0 | 1800 |

*The count was made by counting 1 square and multiplying by the number of squares on the pad (158).
**The count was made by counting a quarter of the sample and multiplying by 4

The 2.4 and 4.75 mm zeolite both performed exactly the same, deactivating all the E. coli colonies. The 1.4 mm zeolite did not have a large impact on the number of colonies on the sample. After future experiments and a new design of the housing, we determined we would continue testing with the 4.75 mm zeolite Zeolite Repeatability:

The purpose of this experiment was to determine if the zeolite would continue to be effective beyond 10 trials. Ensuring the device will work numerous times is an important aspect of the design. We tested the same peanut for 50 trials at a 30 second shaking time.

TABLE 2

Results from Zeolite Repeatability
E. coli counts (CFU/100 ml)

| | Control Effluent | 4.75 mm Treated |
|---|---|---|
| Trail 10 | 10000* | 0 |
| Trial 20 | — | 0 |
| Trial 30 | — | 0 |
| Trial 40 | — | 0 |
| Trial 50 | — | 0 |
| Average | 10000* | 0 |

*The count was made by counting 1 square and multiplying by the number of squares on the pad (158).

The zeolite successfully deactivated all colonies in each trial sampled. The fact that device kept working after 50 trials means silver leaching may not be present or it stops occurring after a certain point. If leaching was present, the device may not have the ability to deactivate 10,000 colonies successfully.

Kill Rate of Zeolite:

The purpose of this experiment was to determine the kill rate of the device. We had previously been using 60 and 30 seconds as our standards but needed to know where the threshold lies.

TABLE 3

Results from Kill Rate of Zeolite
E. coli counts (CFU/100 ml)

| Sample | Number Of Colonies |
|---|---|
| Control | 4500* |
| 1 Sec Dip | 4200* |
| 5 Sec Shake | 37 |
| 10 Sec Shake | 9 |
| 15 Sec Shake | 0 |
| 20 Sec Shake | 0 |
| 25 Sec Shake | 0 |
| 30 Sec Shake | 0 |

*The count was made by counting 1 square and multiplying by the number of squares on the pad (158).

The number of colonies and the time exposed to the device are correlated. There is an enormous decrease in the number of colonies from 1 second to 5 seconds, but a few colonies remain through 10 seconds of exposure. The data seems to show that the threshold for the device's effectiveness is around 15 seconds.

Having thus described several aspects of several different embodiments as claimed herein, it is to be appreciated that various alterations, modifications and improvements will readily occur to those skilled in the art. Such alterations, modifications, and improvements are intended to be part of this disclosure and are within the spirit and scope of this invention. Accordingly, the description and drawings are by way of example only. The invention is intended to be limited only by the following claims and their equivalents, and is not intended to be limited by any is single embodiment described above.

What is claimed is:

1. A method for deactivating water-borne pathogens in drinking water, comprising:
   placing 50 mL of distilled water and $AgNO_3$ in a receptacle;
   adding 18 g of spherical zeolite particles to the receptacle, the zeolite particles having a diameter of 4.75 mm, a pore size of 10 angstroms, and a density of 689 grams per liter (43 pounds per cubic foot);
   letting the receptacle sit for no more than 60 minutes to obtain treated zeolite particles;
   removing the treated zeolite particles from the receptacle;
   allowing the resulting quantity of treated zeolite particles to dry;
   retaining the resulting quantity of the treated zeolite particles in a perforated cylindrical canister;
   obtaining a drink container with no more than 500 mL of drinking water, the drinking water contaminated with between 3,100 to 10,000 Colony Forming Counts (CFU) of E.coli per 100 mL;
   disposing the perforated cylinder canister within the drink container and stirring for no more than 30 seconds,
   thereby allowing the drinking water to flow through the perforated cylinder and thus around the treated zeolite particles, to deactivate the E.coli without filtering the E.coli from the drinking water;
   removing the perforated cylindrical canister from the drink container in no more than 30 seconds; and
   further resulting in deactivation of at least 99.9% of the E.coli in no more than 30 seconds.

2. The method of claim 1 wherein a charge of the E.coli is opposite to a charge of the treated zeolite particles.

3. The method of claim 1 additionally comprising:
   disposing the treated zeolite particles within a flexible liner disposed within said cylindrical canister.

4. The method of claim 1 additionally comprising:
   emptying the drink container;
   refilling the drink container with a second quantity of contaminated water having no more than 500 mL of drinking water contaminated with between 3,100 to 10,000 Colony Forming Counts (CFU) of E.coli per 100 mL;
   again disposing the perforated cylindrical canister in the drink container and stirring for no more than 30 seconds;
   again removing the perforated cylindrical canister from the drink container; and to again thereby deactivate at least 99% of the *E.coli* in the second quantity of contaminated drinking water.

\* \* \* \* \*